(12) United States Patent
Pfeiffer et al.

(10) Patent No.: US 12,526,123 B2
(45) Date of Patent: Jan. 13, 2026

(54) SYSTEM, METHOD AND COMPUTER PROGRAM FOR DETERMINING ESTIMATED SENSOR DATA

(71) Applicant: Bayerische Motoren Werke Aktiengesellschaft, Munich (DE)

(72) Inventors: Jakob Pfeiffer, Waakirchen (DE); Mohamed Ali Razouane, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 619 days.

(21) Appl. No.: 17/916,965

(22) PCT Filed: Feb. 2, 2021

(86) PCT No.: PCT/EP2021/052359
§ 371 (c)(1),
(2) Date: Oct. 4, 2022

(87) PCT Pub. No.: WO2021/219259
PCT Pub. Date: Nov. 4, 2021

(65) Prior Publication Data
US 2023/0140907 A1 May 11, 2023

(30) Foreign Application Priority Data

Apr. 27, 2020 (EP) .................................... 20171463

(51) Int. Cl.
*H04L 7/00* (2006.01)
(52) U.S. Cl.
CPC .................................. *H04L 7/0033* (2013.01)
(58) Field of Classification Search
CPC ........................... H04L 7/0033; H04W 56/005
See application file for complete search history.

(56) References Cited

U.S. PATENT DOCUMENTS

2002/0063002 A1* 5/2002 Lasson ................... B60K 6/365
 903/910
2010/0058095 A1* 3/2010 Malek ....................... G06F 1/12
 713/375

(Continued)

FOREIGN PATENT DOCUMENTS

| CN | 104011563 A | 8/2014 |
| CN | 109792698 A | 5/2019 |

(Continued)

OTHER PUBLICATIONS

Extended European Search Report corresponding to European Application No. 20171463, dated Oct. 9, 2020 (9 pages).

(Continued)

*Primary Examiner* — Jamal Javaid
(74) *Attorney, Agent, or Firm* — Maginot, Moore & Beck LLP

(57) ABSTRACT

A system, method and computer program determine estimated sensor data using time-series projection. The system comprises processing circuitry configured to obtain a plurality of samples of sensor data of the sensor. The processing circuitry is configured to obtain information on a time offset between the sensor data of the sensor and a reference time. The processing circuitry is configured to perform a time-series projection based on the plurality of samples of the sensor data. The time-series projection is performed using an auto-regressive statistical model. The processing circuitry is configured to determine an estimate of the sensor data for the reference time based on the time-series projection and based on the time offset between the sensor data and the reference time. Thus, the time-series projection may be used to bridge the time offset between the sensor data of the sensor and the reference time.

20 Claims, 3 Drawing Sheets

(56) References Cited

U.S. PATENT DOCUMENTS

| | | | |
|---|---|---|---|
| 2012/0239241 A1* | 9/2012 | Nesbitt | B60T 8/17551 |
| | | | 701/29.2 |
| 2014/0300512 A1 | 10/2014 | Steinhardt et al. | |
| 2019/0118829 A1 | 4/2019 | Goldberg et al. | |
| 2019/0344735 A1 | 11/2019 | Granig | |

FOREIGN PATENT DOCUMENTS

| | | |
|---|---|---|
| CN | 110799918 A | 2/2020 |
| CN | 110914128 A | 3/2020 |

OTHER PUBLICATIONS

Written Opinion corresponding to International Patent Application No. PCT/EP2021/052359, dated Apr. 11, 2021 (8 pages).
Chinese Office Action corresponding to Chinese Patent Application No. 202180025666.0, dated Feb. 28, 2025. (9 pages).
English Translation of Chinese Office Action corresponding to Chinese Patent Application No. 202180025666.0, dated Feb. 28, 2025. (8 pages).

\* cited by examiner

| Algorithm | RMSE | MAPE (%) | % improvement over benchmark |
|---|---|---|---|
| Simple Exp. Smoothing | 1,85 | 4,25 | -0,2 |
| Holt-Winter Exp. Smoothing | 1,84 | 4,24 | 0 |
| ARIMA | 1,59 | 3,90 | 8 |
| TBATS | 0.74 | 7,48 | -76,4 |
| BATS | 0.75 | 7,47 | -76,1 |
| Random Walk | 1,81 | 4,38 | -3,3 |
| Naive (Benchmark) | 1,84 | 4,24 | 0 |

Fig. 4a

| Algorithm | MAPE % | Run-Time (ms) | # Historical Data Points |
|---|---|---|---|
| Simple Exp. Smoothing | 4,25 | 6 | 10 |
| Holt-Winter Exp. Smoothing | 4,24 | 7 | 10 |
| ARIMA | 3,90 | 490 | 40 |
| TBATS | 7,48 | $18 \cdot 10^3$ | 10 |
| BATS | 7,47 | $12 \cdot 10^3$ | 10 |
| Random Walk | 4,38 | 0,5 | 5 |
| Naive (Benchmark) | 4,24 | 0,064 | 1 |

Fig. 4b

SYSTEM, METHOD AND COMPUTER PROGRAM FOR DETERMINING ESTIMATED SENSOR DATA

The present application is the U.S. national phase of PCT Application PCT/EP2021/052359 filed on Feb. 2, 2021, which claims priority of European patent application No. 20171463.1 filed on Apr. 27, 2020, which is incorporated herein by reference in its entirety

FIELD

The disclosure relates to a system, method and computer program for determining estimated sensor data using time-series projection.

BACKGROUND

Modern vehicles comprise several distributed and embedded systems. For example, the climate control unit and the motor unit are separate embedded systems. Each of these systems may comprise one or more sensors and an Electronic Control Unit (ECU). The ECUs often are connected and exchange information via bus systems. The bus communication may require time and thus, many measurements are delayed once they arrive at an ECU.

SUMMARY

There may be a desire for an improved concept for dealing with locally-delayed sensor measurements.

This desire is addressed by the subject-matter of the independent claims.

Embodiments of the present disclosure are based on the finding, that, in vehicles, the sensor data generated by various sensors often is out-of-sync, e.g. due to delays being introduced by the transmission of the respective sensor data over a bus system of the vehicle, or due to delays being introduced by the encoding and decoding of the sensor data for transportation of the bus. The delays that occur in such systems are often deterministic, i.e. they have a fixed value. Embodiments use time-series projection to project the trend of the sensor data into the future, to bridge the gap being introduced by the above-mentioned delays. Embodiments of the present disclosure may thus use time series prediction to compensate for time delays in signal transmission.

Embodiments of the present disclosure provide a system for determining estimated sensor data of a sensor. The system comprises processing circuitry configured to obtain a plurality of samples of sensor data of the sensor. The processing circuitry is configured to obtain information on a time offset between the sensor data of the sensor and a reference time. The processing circuitry is configured to perform a time-series projection based on the plurality of samples of the sensor data. The time-series projection is performed using an auto-regressive statistical model. The processing circuitry is configured to determine an estimate of the sensor data for the reference time based on the time-series projection and based on the time offset between the sensor data and the reference time. Thus, the time-series projection may be used to bridge the time offset between the sensor data of the sensor and the reference time.

There are various types of auto-regressive statistical models. One subset of auto-regressive statistical models is based on the concept of "moving-average". In other words, the auto-regressive statistical model may be an auto-regressive moving average-model. In a moving average model, the output value depends linearly on the current and one or more past values of a stochastic term. In particular, the regression error may be a linear combination of current and previous error terms.

In some embodiments, the auto-regressive model is applied on a differentiation of the plurality of samples of the sensor data. Using the differentiation, the sensor data may be made stationary, so it does not depend on the time at which the sensor data is observed. For example, the auto-regressive model is applied on a once-derived version of the plurality of samples of the sensor data, which was shown to be appropriate for the types of sensor data being processed by the proposed approach.

For example, the auto-regressive model may be one of an Autoregressive Integrated Moving Average (ARIMA), or an Autoregressive Moving Average (ARMA) model. In particular ARIMA models have shown to provide a good compromise between prediction accuracy and computational effort.

For example, the time-series projection may be performed using at least 20 samples and/or at most 60 samples of the sensor data of the sensor. A lower number of samples may yield a lower computational complexity, while a larger number of samples may yield an increased accuracy. In an evaluation of the proposed approach, a number of 40 samples was found to yield a high prediction accuracy.

For example, the sensor data of the sensor may relate to a current of a power train of an electric vehicle. In electric vehicles (EVs), the sensor data of the power train may be processed in real-time to improve battery management and manage the power draw of the power train.

In various embodiments, the processing circuitry is configured to perform the time-series projection such, that the time offset between the sensor data and the reference time is bridged by the time-series projection. The processing circuitry may be configured to output the estimate of the sensor data. Thus, the time offset may be compensated, and another ECU may use sensor data that is estimated for the reference time.

For example, the processing circuitry may be configured to perform the time-series projection with a projection horizon that matches the time offset between the sensor data and the reference time. In other words, the time-series projection may be aimed at projecting the sensor data to the reference time.

In general, the sensor data may be estimated to allow a synchronization of the sensor data with sensor data of a second sensor, e.g. in order to eliminate a time offset between the two sets of sensor data. For example, the reference time may be based on sensor data of a second sensor. The sensor data of the second sensor may comprise a second plurality of samples. The processing circuitry may be configured to determine the estimate of the sensor data such, that the estimate of the sensor data is time-synchronized to the latest sample of the sensor data of the second sensor. Thus, a time offset between the two sets of sensor data may be eliminated.

For example, the processing circuitry may be configured to obtain the sensor data of the second sensor. The processing circuitry may be configured to derive the time offset between the sensor data of the sensor and the reference time based on the sensor data of the second sensor and based on the sensor data of the sensor. In other words, the processing circuitry may determine the time offset and compensate for the determined time offset. Alternatively, the time offset may be pre-defined, or determined by another system.

In various embodiments, the processing circuitry is configured to output time-synchronized versions of the estimated sensor data of the sensor and of the sensor data of the second sensor. Thus, a subsequent processing of the two sets of sensor data may be facilitated.

Embodiments of the present disclosure further provide a corresponding method for determining estimated sensor data. The method comprises obtaining a plurality of samples of sensor data of a sensor. The method comprises obtaining information on a time offset between the sensor data of the sensor and a reference time. The method comprises performing a time-series projection based on the plurality of samples of the sensor data. The time-series projection is performed using an auto-regressive statistical model. The method comprises determining an estimate of the sensor data for the reference time based on the time-series projection and based on the time offset between the sensor data and the reference time.

Embodiments of the present disclosure further provide a corresponding computer program having a program code for performing the above method, when the computer program is executed on a computer, a processor, or a programmable hardware component.

BRIEF DESCRIPTION OF THE DRAWINGS

Some examples of apparatuses and/or methods will be described in the following by way of example only, and with reference to the accompanying figures, in which

FIG. 4a shows a table of overviews of prediction and runtime performance scores obtained by algorithms being evaluated; and FIG. 4b shows another table of overviews of prediction and runtime performance scores obtained by algorithms being evaluated.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
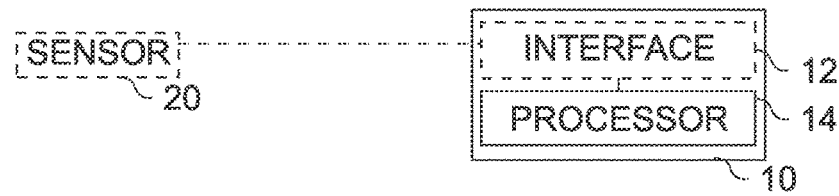
FIG. 1a shows a block diagram of an embodiment of a system for determining estimated sensor data.

FIG. 1a shows a block diagram of an embodiment of a system 10 for determining estimated sensor data of a sensor 20. The system 10 comprises processing circuitry 14. Optionally, the system further comprises an interface 12 that is coupled to the processing circuitry 14. In general, the functionality of the system is provided by the processing circuitry 14, e.g. in conjunction with the interface 12. For example, the processing circuitry is configured to obtain a plurality of samples of sensor data of the sensor 20. The processing circuitry is configured to obtain information on a time offset between the sensor data of the sensor and a reference time. The processing circuitry is configured to perform a time-series projection based on the plurality of samples of the sensor data. The time-series projection is performed using an auto-regressive statistical model. The processing circuitry is configured to determine an estimate of the sensor data for the reference time (i.e. with reference to the reference time, or projected to the reference time) based on the time-series projection and based on the time offset between the sensor data and the reference time.

Figure 1B:
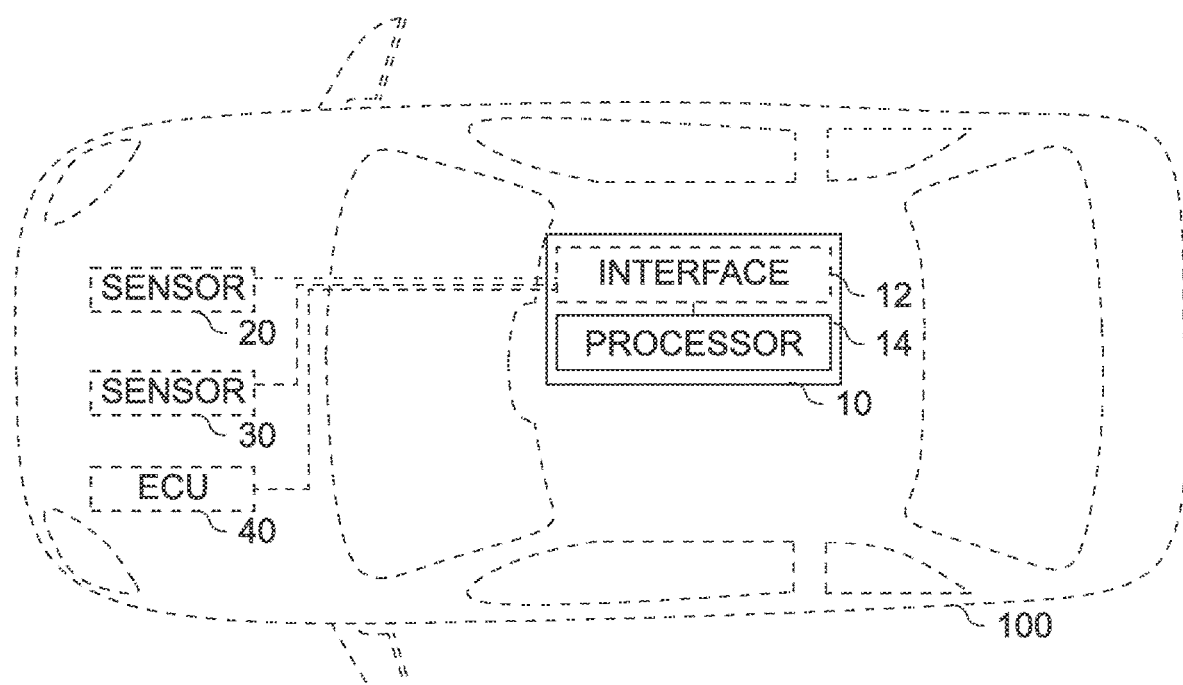
FIG. 1b shows a block diagram of an embodiment of a vehicle comprising a system for determining estimated sensor data.

For example, the system 10 may be used to process sensor data of a sensor 20 of a vehicle. Accordingly, FIG. 1b shows a block diagram of an embodiment of a vehicle 100 comprising the system 10 and the sensor 20. Optionally, the vehicle may further comprise a second sensor 30 and/or an electronic control unit 40. The system 10, the sensor 20 and the optional second sensor 30 and/or the optional electronic control unit 40 may communicate via a communication system (e.g. a bus system) of the vehicle, e.g. via ethernet, via a Controller Area Network Bus (CAN bus) or a Local Interconnect Network (LIN). For example, the vehicle 100 may be a land vehicle, a road vehicle, a car, an automobile, an off-road vehicle, a motor vehicle, a truck or a lorry. In general, the vehicle may not be limited to roads. For example, the vehicle may be a train, a ship or an airplane. While embodiments have been envisioned with vehicles in mind, embodiments may also be applied to other fields, e.g.

industrial machines. Embodiments thus provide an industrial machine, such as a power plant or a manufacturing plant comprising the system 10.

Figure 1C:
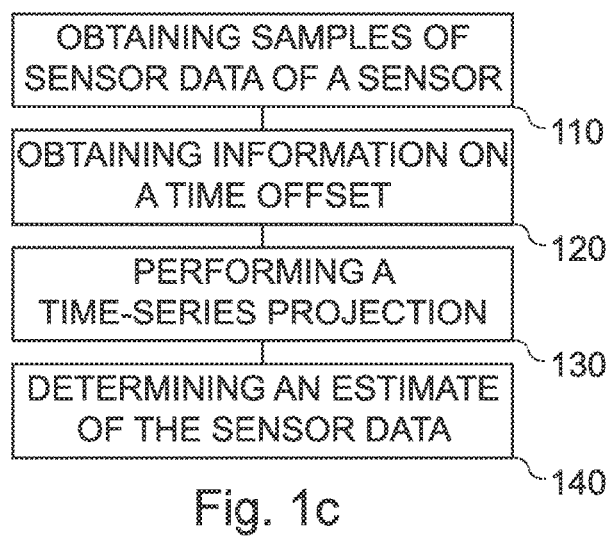
FIG. 1c shows a flow chart of a method for determining estimated sensor data.

FIG. 1c shows a flow chart of a corresponding method for determining estimated sensor data. The method comprises obtaining 110 a plurality of samples of sensor data of a sensor. The method comprises obtaining 120 information on a time offset between the sensor data of the sensor and a reference time. The method comprises performing 130 a time-series projection based on the plurality of samples of the sensor data. The time-series projection is performed using an auto-regressive statistical model. The method comprises determining 140 an estimate of the sensor data for the reference time based on the time-series projection and based on the time offset between the sensor data and the reference time.

The following description relates both to the system of FIGS. 1a and/or 1b and to the method of FIG. 1c. Features described in connection with the system of FIGS. 1a and/or 1b may likewise be applied to the method of FIG. 1c.

Embodiments of the present disclosure relate to a system, method and computer program for determining estimated sensor data. As has been laid out before, the system method and computer program may be used to determine estimated sensor data in cases, in which the sensor data lags behind a reference time, e.g. due to signal processing being performed by the sensor, or due to delays being introduced by transmission of the sensor data within the system e.g. within the vehicle 100.

The processing circuitry is configured to obtain the plurality of samples of sensor data of the sensor 20. In general, the plurality of samples of the sensor data of the sensor may be samples being generated by the sensor 20. The plurality of samples may be equidistant in time, i.e. with a pre-defined time interval between samples. For example, a timing of the plurality of samples may be based on a pre-defined sampling rate of the sensor 20, or based on pre-defined sample output rate of the sensor 20. In various embodiments, the distance in time between the plurality of samples of the sensor data of the sensor (which may in the following also be denoted the first sensor) may be the same as the distance in time between a plurality of samples of sensor data of the second sensor 30 as introduced in connection with FIG. 1b).

There are a variety of types of sensor data the proposed approach can be applied on. For example, the sensor data may be sensor data of a vehicular sensor, i.e. of a sensor being employed in a vehicle. For example, the vehicle may be an electric vehicle (EV), and the sensor data may be sensor data of a sensor related to the electric power train of the electric vehicle. For example, the sensor data of the (first) sensor may relate to a current of a power train of an electric vehicle 100, for example to a current being output by a battery system of the electric vehicle, or to a current being used by one or more electric motors of the electric vehicle 100. Alternatively, the sensor may be a sensor of another type of distributed system, e.g. of a machine, such as an industrial plant, a robot or an airplane. In general, the distributed system, e.g. the vehicle, machine, industrial plant, robot, airplane etc., may comprise the system and the sensor (and optionally the second sensor).

The processing circuitry is configured to obtain the information on the time offset between the sensor data of the sensor and the reference time. In general, the information on the time offset between the sensor data of the sensor and the reference time may indicate, how far the samples of the sensor data lag behind the reference time. For example, if the current time is the reference time, a sample of the plurality of samples of the sensor data of the (first sensor) may be obtained (by the processing circuitry) at time t (e.g. the reference time), but relate to a measurement having occurred at time $t-t_o$, with $t_o$ being the time offset. A similar logic may be applied if the reference time is not the current time, but for example, being defined by samples of the second sensor. In this case, t, the reference time, may be defined by a measurement having occurred at the second sensor, or to a time a sample of the second sensor has been received by the processing circuitry. In any case, the information on the time offset between the sensor data of the sensor and the reference time may define the lag or delay between the reference time and the time a sample of the sensor data of the (first) sensor is obtained by the processing circuitry, the sample being measured at a pre-defined time relative to the reference time (e.g. at the reference time). In general, the information on the time offset between the sensor data of the sensor and the reference time may be received from another system (that has determined the time offset), be read-out from a memory of the system (if the time-offset is at least temporarily constant), or be determined by the processing circuitry, as will be introduced with reference to the second sensor.

The processing circuitry is configured to perform a time-series projection (also known as time-series prediction) based on the plurality of samples of the sensor data. In general, a time-series projection predicts a development of one or more numerical values over a time interval (comprising a plurality of points in time), based on historic data on the one or more numerical values. In other words, a trend of the one or more numerical values may be predicted based on the historic data on the numerical values, and a time-series on the development of the development of the numerical values may be predicted. In embodiments, the samples of the sensor data of the (first) sensor may be seen as time-series, with each of the samples being represented by one or more numerical values. The time-series projection may be applied to extend the time-series into the future (relative to the time-series), i.e. towards the reference time. In other words, the time-series projection may be used to projection the development of the sensor data towards the reference time, thereby closing (or at least reducing) the gap between the latest sample of the sensor data and the reference time.

The time-series projection may be performed using an auto-regressive statistical model. In general, there are a variety of approaches for performing a time-series projection. Some approaches, like exponential smoothing, input the received numerical values into a pre-defined formula to obtain the estimated sensor data. Alternatively, more advanced means, such as machine-learning and/or auto-regressive Markov models may be used to perform time-series projection. In embodiments, a middle ground may be used—an auto-regressive statistical model which is more complex than exponential smoothing, but less complex than the training of machine-learning models. In other words, exponential smoothing might not be seen as statistical models, and neither might machine-learning based approaches, such as auto-regressive Markov models. In embodiments, the auto-regressive statistical model may be a statistical model on which an estimation process for the internal parameters of the statistical model is being performed to perform the time-series projection. In the following, such an internal estimation process is being shown in connection with ARMA and ARIMA models.

As has been laid out before, the auto-regressive statistical model may be an ARMA or an ARIMA-based model. ARMA, and ARIMA, which is an integration-based variant of ARMA, are auto-regressive statistical models that provide a time-series projection of numerical values of a time series. To take apart the acronyms—AR stands for Auto Regressive and MA stands for Moving Average. In general, auto-regressive statistical models for time-series projection are statistical models that (only) use previous numerical values of the time-series to perform the regression-based time-series projection, i.e. the projection may be solely based on the previous numerical values of the time-series. In a moving average model, the output value depends linearly on the current and one or more past values of a stochastic term. In particular, the regression error may be a linear combination of current and previous error terms. Accordingly, the auto-regressive statistical model may be an auto-regressive moving average-model.

More details of the ARMA and ARIMA models are shown in a later part of the present disclosure.

As has been pointed out above, ARIMA models are a variant of ARMA models, where the letter "I" indicates that the model is an integrated model, i.e. a model that comprises an integration component. More particular, in ARIMA, the time-series projection is being applied on differentiated version of the numerical values. In other words, the auto-regressive model may be applied on a differentiation of the plurality of samples of the sensor data. In ARIMA, often-times, a once-derived version of the numerical values is being used. In other words, the auto-regressive model may be applied on a once-derived version of the plurality of samples of the sensor data. In general, the differentiation may be calculated by calculating a difference between subsequent samples of the plurality of samples. In other words, the differentiated version (e.g. the once-derived version) of the plurality of samples may be calculated by subtracting, for each sample (bar the first) of the plurality of samples, the previous sample of the plurality of samples from the sample.

In general, in ARMA or ARIMA-based models, various procedures may be applied to perform the time-series projection. In general, the processes "estimation", "validation" and "application" may be applied within the statistical model. In general, "estimation" relates to the estimation of internal polynomial values representing the time-series. In other words, the processing circuitry may be configured to estimate the internal polynomial values representing the time-series, e.g. using maximum-likelihood estimation or using least-squares estimation. "Validation" refers to the process of validating the time-series projection being performed based on the identified internal polynomial values, e.g. in terms of whether error residuals being generated by the time-series values are uncorrelated and/or whether the error residuals behave like white noise. In other words, the processing circuitry may be configured to validate the estimated internal polynomial values representing the time-series. "Application" refers to the process of performing and outputting the time-series projection. In other words, the processing circuitry may be configured to perform the time-series projection using the estimated internal polynomial values representing the time-series.

In some embodiments, a process "identification" may be applied, to identify the general parameters of the ARMA or ARIMA model. Alternatively, the general parameters of the ARMA or ARIMA model may be pre-defined. In other words, the processing circuitry may be configured to obtain the general parameters of the ARMA or ARIMA model from memory of the system, or to determine the general parameters (e.g. using a bounded exhaustive grid search). For example, as will be introduced in a later part of the disclosure, the Akaike Information Criterion (AIC) may be used to determine the general parameters of the ARMA or ARIMA model.

In general, both ARMA and ARIMA models have at least two general parameters, which are generally specified as p, which is the trend autoregression order, and q, which is the trend moving average order. In addition, ARIMA-based models have the general parameters d, which defines the trend difference order. In experiments, the parameter values $p=1$, $d=1$ and $q=4$ were found to be suitable parameters. In other words, the ARMA model may be used with parameters $p=1$ and $q=4$, and the ARIMA model may be used with $p=1$, $d=1$ and $q=4$. In addition, 40 previous samples were found to provide a suitable set of historic data. In other words, the time-series projection may be performed using at least 20 samples (or at least 30 samples) and/or at most 60 samples (or at most 50 samples) of the sensor data of the sensor, e.g. 40 samples.

Some auto-regressive statistical models use so-called seasonality to model seasonal variations in the time-series. This is useful in time-series with seasonal changes, such as changes between weekends and weekdays, or between daytime and night-time hours. In embodiments, however, such seasonal changes might not be applicable, e.g. as the time horizon being incorporated may be too small to exhibit seasonality. Accordingly, general parameters related to seasonality may be ignored or set to zero. For example, in ARIMA, general parameters related to the seasonality of the time-series projection may be defined, such as P (Seasonal auto-regressive order), D (Seasonal difference order), Q (Seasonal moving average order) and m (The number of time steps for a single seasonal period). These general parameters may be ignored or set to zero, i.e. (P, D, Q, m)=(0, 0, 0, 0).

In general, whatever auto-regressive statistical model is used, the projection horizon being used may be defined such, that it bridges the gap defined by the time-offset. In other words, the processing circuitry may be configured to perform the time-series projection with a projection horizon that matches the time offset between the sensor data and the reference time. For example, the time-series projection may extend the sensor data of the sensor such, that the gap between the sensor data and the reference time is bridged. In other words, the processing circuitry may be configured to perform the time-series projection such, that the time offset between the sensor data and the reference time is bridged by the time-series projection.

The processing circuitry is configured to determine the estimate of the sensor data for the reference time based on the time-series projection and based on the time offset between the sensor data and the reference time. For example, as has been laid out before, the time-series projection may extend the sensor data of the sensor such, that the gap between the sensor data and the reference time is bridged. The processing circuitry may be configured to use an output of the time-series projection that corresponds to an estimate of the sensor data for the reference time to determine the estimate of the sensor data for the reference time. In various embodiments, at any given point in time, the processing circuitry may be configured to determine a single estimate of the sensor data for (i.e. at, with reference to) the reference time (relative to the current sensor data), and omit the time between the latest sample and the sample estimated for the reference time. Finally, the processing circuitry may be configured to output the estimate of the sensor data.

As has been pointed out before, the distributed system, e.g. the vehicle, may comprise a second sensor. In some embodiments, this second sensor may be sensor that provides sensor data with less of a gap to the reference time, or zero gap to the reference time, and may thus be used as a reference. Accordingly, the reference time may be based on sensor data of a second sensor 30. For example, the reference time may be defined by the latest sample of sensor data of the second sensor, or the reference time may be in a pre-defined relationship with the sensor data of the sensor. The time-series projection may be used to synchronize the sensor data of the first and sensor data. In more formal terms, the sensor data of the second sensor may comprise a second plurality of samples, and the processing circuitry may be configured to determine the estimate of the sensor data such, that the estimate of the sensor data is time-synchronized to the latest sample of the sensor data of the second sensor. In other words, the estimate of the sensor data may be determined for a point in time that matches the point in time of the latest sample of the second plurality of samples of the second sensor. Again, the latest sample of the second plurality of samples may either define the reference time, or be in a pre-defined temporal relationship with the reference time.

Alternatively or additionally, the distributed system, e.g. the vehicle, may comprise another electronic control unit (ECU) 40, which is coupled to the system 10 (which may also be an electronic control unit). Embodiments of the present disclosure may be used to compensate for the delay being introduced by transmissions from one electronic control unit to another, with the transmissions being performed over a bus system of the distributed system/vehicle. Accordingly, the reference time may be based on a communication delay between the system 10 and the electronic control unit 40. For example, the time offset may correspond to the communication delay (or to the negative of the communication delay) between the system 10 and the electronic control unit 40.

In various embodiments, the processing circuitry is further configured to obtain the sensor data of the second sensor, e.g. via the interface 12. The sensor data of the second sensor may be used for at least one of two things—to determine the reference time, and to provide time-synchronized versions of the sensor data of the first and second sensor.

For example, the processing circuitry may be configured to derive the time offset between the sensor data of the sensor and the reference time based on the sensor data of the second sensor and based on the sensor data of the sensor (as the latest sample of the sensor data of the second sensor can be in a pre-defined temporal relationship with, or define, the reference time. In general, the first and second sensor data may be correlated. As an example, in a power train of an electric vehicle, the output of the battery is generally correlated with the current draw of the electric motor(s), and/or with the temperature of one or more components of the power train (as the current is not only used to generate mechanical power, but also corresponding heat in the various components). Thus, a change in the sensor data of the first sensor may see a corresponding (i.e. correlated) change in the sensor data of the second sensor, the change being perceptible with the same time-offset that is being used in the time-series projection. The processing circuitry may be configured to calculate the correlation between the sensor signal of the first sensor and several time-shifted versions of the sensor data of the second sensor (or vice versa). The time-shifted version that yields the highest degree of correlation may be based on the (correct) time offset. Thus, the processing circuitry may be configured to use a correlation analysis on time-shifted versions of the sensor data of the first and second sensor to determine the time-offset.

Additionally or alternatively, the sensor data of the first and second sensor may be output in a time-synchronized manner. In other words, the processing circuitry may be configured to output time-synchronized versions of the estimated sensor data of the sensor and of the sensor data of the second sensor.

The interface 12 may correspond to one or more inputs and/or outputs for receiving and/or transmitting information, which may be in digital (bit) values according to a specified code, within a module, between modules or between modules of different entities. For example, the interface 12 may comprise interface circuitry configured to receive and/or transmit information.

In embodiments the processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general-purpose processor, a Digital Signal Processor (DSP), a micro-controller, etc.

More details and aspects of the system and method are mentioned in connection with the proposed concept or one or more examples described above or below (e.g. FIGS. 2*a* to 4*b*). The system and method may comprise one or more additional optional features corresponding to one or more aspects of the proposed concept or one or more examples described above or below.

Embodiments of the present disclosure relate to the enhancement of measurement quality in electronic vehicles. Vehicles can be likened to distributed systems, which comprise many control units (ECUs) that are connected and communicate with each other via bus systems. Unfortunately, time delays may occur in bus communication. These lead to delays and thus to a loss of efficiency. The delays may be individual for each ECU (as the origin of the signal) and can be determined. After determining the delays, the values between the last received signal and the current time step may still be known. In some other systems, auto-regressive Markov models (ARMMs) and neural networks may be used to predict the values between the last received signal and the current time step.

To give an example: Signal 1 arrives 3 time-steps later than signal 2. In embodiments, the time delay may be determined to find out that signal 1 is delayed by 3 time-steps relative to signal 2, and the signal may be corrected accordingly. Embodiments of the present disclosure focus on the prediction of the values of signal 1 for the current time step and the two previous time-steps.

In the following, an evaluation of different time-series projection algorithms is shown. Five advanced and two naive different algorithms to generate the missing signal values using time series prediction from the already received values were evaluated. The algorithms considered are Exponential Smoothing (in two different versions), ARIMA, Box-cox transformation, ARMA (Autoregressive Moving Average) residuals, Trend and Seasonality (BATS) and Trigonometric seasonal, Box-cox transformation, ARMA residuals, Trend and Seasonality (TBATS) as well as the naive methods "predicted value=last received value" and Random Walk. Additionally, the combination of different algorithms via bagging or bootstrap aggregation were evaluated.

The current measurement signal of the high-voltage storage (HVS) is received by the control unit (ECU) delayed by about 6 time-steps compared to the signal of the electric machine in reality. Accordingly, while the signal can be corrected, and the signal values can be associated with their "actual" time, embodiments may be used to predict the 6 values that have not been received. With the help of the above-mentioned algorithms, these 6 values may be approximated/estimated from the e.g. 20 last received measured values. For example, embodiments may be used in vehicles and machines, airplanes etc.

Various embodiments of the present disclosure relate to time series prediction for measurements of electric powertrains. Real-time systems require up-to-date information. Measurement signals in the power train of Electric Vehicles (EVs) are however often received with individual time delays due to the distributed architecture of the power train. Embodiments of the present disclosure provide an approach that attempts to compensate the time delays by predicting each signal from the last received value until the present time step. In the following, 5 time-series prediction algorithms and 2 naive methods are evaluated for time series prediction. The algorithms were applied on real power train data of EVs and the results were evaluated. The evaluation focuses on run-time, precision and accuracy. As will be shown in the following, the evaluated methods achieve a prediction error rate of less than 5%. As expected, the benchmark naive method is the fastest. Surprisingly, it retrieves comparable results to Exponential Smoothing. Box-cox transformation, ARMA (Autoregressive Moving Average) residuals, Trend and Seasonality (BATS) and Trigonometric seasonal, Box-cox transformation, ARMA residuals, Trend and Seasonality (TBATS) are the slowest algorithms. Nevertheless, they achieve the best accuracy, but suffer from outliers. ARIMA (Autoregressive Integrated Moving Average) has the highest precision and thus the best compromise between outliers and accuracy of all algorithms. Additionally, to further improve the accuracy, the benefits of combining predictions of different algorithms were evaluated.

Modern vehicles comprise several distributed and embedded systems. For example, the climate control unit and the motor unit are separate embedded systems. Each of these systems comprises one or more sensors and an Electronic Control Unit (ECU). The ECUs are connected and exchange information via bus systems. The bus communication requires time and thus, many measurements are delayed once they arrive at an ECU (see FIG. 2a). Conversely, this means that from an ECU's perspective, measurements of the actual time step from other ECUs are not yet available (see FIG. 2b).

Figure 2A:
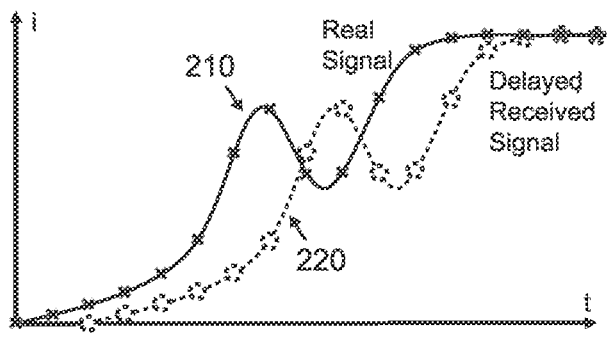
FIG. 2a shows a graph related to the availability of sensor data.
Figure 2B:
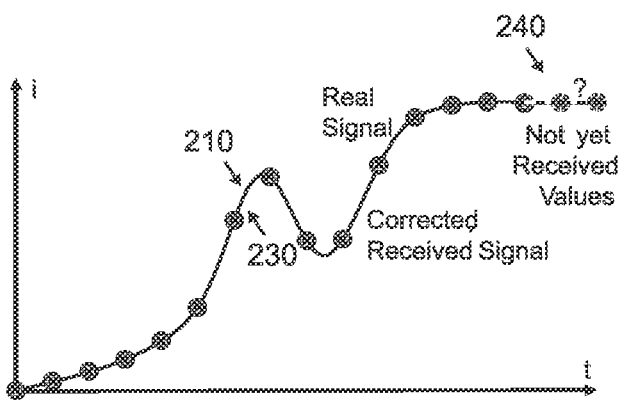
FIG. 2b shows another graph related to the availability of sensor data.

FIGS. 2a and 2b show graphs related to the availability of sensor data. In FIG. 2a, a graph is shown, where a difference between a "real" signal 210 (labeled with crosses) and a delayed, received signal 220 (dashed line, labeled with dashed circles) is shown. Due to time delays between the distributed system in the power train of EVs, an ECU receives a delayed version 220 of the original measurement signal 210. In FIG. 2b, a scenario is shown where the delayed signal is corrected 230 (such that the received samples are attributed their correct time), so it becomes evident that the latest samples 240 are missing. In other words, if the delayed signal is corrected by performing automatic time-delay estimation, it becomes evident that the measurements of the last time-steps 240 have not yet been received. Nevertheless, those actual measurements may be required for controlling the EV. Embodiments of the present disclosure may attempt to predict the missing values until the present (by performing a time-series projection). The missing or delayed availability of measurements is problematic, because many vehicular real-time control functions depend on these data and their timeliness. Especially Electric Vehicles (EVs) lose efficiency and performance due to time delays (see J. Pfeiffer and X. Wu (2019), "Automated Time Delay Estimation for Distributed Sensor Systems of Electric Vehicles"). Embodiments of the present disclosure may construct plausible virtual measurement values for not yet received signals. The already received measurements from past time-steps may be used to predict the values until the present.

In the following, four groups of algorithms are presented.

A first group of algorithms relate to Exponential Smoothing: Exponential Smoothing is a family of time series prediction algorithms first proposed more than 60 years ago (see R. G. Brown and A. D. Little (1956), "EXPONENTIAL SMOOTHING FOR PREDICTING DEMAND"). In the following, the simple and the fully additive Holt-Winters model (R. J. Hyndman and Y. Khandakar (2008): "Automatic Time Series Forecasting: The forecast Package for R") is being used.

The basic idea of Exponential Smoothing is to construct predictions of future values $\hat{y}_{t+1}$ as weighted averages of past observations $y_t$ and former predictions $\hat{y}_t$. The heavier weight is thereby assigned to the more recent values. Values from the more distant past are weighted less. Formally, the simple Exponential Smoothing prediction equation can be written as $$\hat{y}_{t+1} = \alpha \cdot y_t + (1-\alpha) \cdot \hat{y}_t \qquad (1)$$

where $0 < \alpha < 1$ is a smoothing factor.

An extension of this basic model is the fully additive Holt-Winters model. It predicts the value for the next time step by considering additive trend and seasonality. The seasonality aspects are included by extending the prediction from equation (1) by the 3 hidden state variables $$l_t = \alpha \cdot (y_t - s_{t-m}) + (1-\alpha) \cdot (l_{t-1} + b_{t-1}),$$

$$b_t = \beta \cdot (l_t - l_{t-1}) + (1-\beta) \cdot b_{t-1},$$

$$s_t = \gamma \cdot (y_t - l_{t-1} - b_{t-1}) + (1-\gamma) \cdot s_{t-m}, \qquad (2)$$

where $l_t$ is the series level, $b_t$ the trend, and $s_t$ the seasonal component at time step t. $\alpha$, $\beta$ and $\gamma$ are the corresponding smoothing coefficients. These are fitted by an optimization algorithm and have values between 0 and 1. m denotes the seasonality factor. It reflects the number of time-steps in a seasonal period and ensures that the seasonality is correctly modeled. m can be obtained by means of a spectral density analysis of the simple and partial autocorrelation functions in conjunction. The new prediction is given by $$\hat{y}_{t+1} = l_t + b_t + s_{t+1-m}. \qquad (3)$$

A second group of algorithms relate to ARIMA. ARIMA is a class of statistical models for analyzing and predicting time series data (V. Kotu and B. Deshpande (2019), Data Science: Concepts and Practice. Cambridge, MA, United States: Elsevier, 2019). It is a generalization of the simpler ARMA extended by integration. The acronym ARIMA is descriptive and captures the key aspects of the model itself. These can be outlined in the 3 following components:

1) Auto-Regressive (AR): A model that uses the dependent relationship between an observation and a number of lagged observations.
2) Integrated (I): Differentiation of raw observations to make the time series stationary. This can be achieved by subtracting an observation at the actual time step from an observation at the previous time step.
3) Moving Average (MA): A model making use of the dependency between an observation and residual errors from a moving average model applied to lagged observations.

Each of these components is explicitly specified in the model parameters in the standard notation ARIMA(p,d,q). They are substituted with integer values to indicate the specific model being used and defined as follows. p is the number of lag observations included in the model, also called the lag order. d is the number of times that the raw observations are differentiated, also called the degree of differentiation. q is the size of the moving average window, also called the order of moving average.

The predicted value $\hat{y}_{t+1}$ of the future step t+1 is therefore a constant and a weighted sum of one or more recent values of y or of one or more recent values of the prediction error e. In an example, let p=1, d=1, q=2. The ARIMA model obtained in this case is a damped-trend linear Exponential Smoothing. It extrapolates the local trend at the end of the time series. Simultaneously, it flattens the trend out at longer forecast horizons to introduce a note of conservatism. For the prediction, first, the dth difference $\hat{y}'_{t+1}$ of the future value $y_{t+1}$ is calculated. The difference is a linear combination of past values of the original time series and past values of the prediction errors. It can be computed according to $$\hat{y}'_{t+1} = l_t + \alpha_0 \hat{y}'_t + \alpha_1 \hat{y}'_{t-1} + \ldots + \alpha_p \hat{y}'_{t-p} + e_{t+1} + \theta_0 e_t + \ldots + \theta_q e_{t-q} \quad (4)$$

where $l_t$ is the local level and $e_t$ the prediction error at time step t. $\alpha_j$ is the slope coefficient relative to the dth difference $\hat{y}'_{t-j}$ of $y_{t-j}$ with j∈ {0, 1, 2, . . . , p}. $\theta_k$ is the moving average parameter relative to the prediction error $e_{t-k}$ with k∈ {0, 1, 2, . . . , q}. $e_{t+1}$ is hereby assumed as white noise. The integrated part of ARIMA is reflected in the dth difference $\hat{y}'_{t-j}$ of $\hat{y}_{t-j}$. For a first differentiation, $\hat{y}'_t$ can for instance be obtained by $$\hat{y}'_t = y_t - y_{t-1} \quad (5)$$

where $y_t$ and $y_{t-1}$ are the true values, respectively at time step t and t−1. Finally, the prediction equation is retrieved:

$$\hat{y}_{t+1} = y_t + \hat{y}'_{t+1} \quad (6)$$

A third group of algorithms relate to Box-cox transformation, ARMA residuals, Trend and Seasonality (BATS) and Trigonometric seasonal, Box-cox transformation, ARMA residuals, Trend and Seasonality (TBATS), which are an extension of the state space modeling framework shown in A. M. De Livera, R. J. Hyndman, and R. D. Snyder (2011): "Forecasting Time Series With Complex Seasonal Patterns Using Exponential Smoothing". They introduce a comprehensive approach for predicting complex seasonal time series such as those with multiple seasonal periods, high frequency seasonality and non-integer seasonality. This is achieved by leveraging the benefits of Box-Cox transformations, Fourier representations with time varying coefficients, and ARMA error correction. The Box-Cox transformation solves the issues of non-linearity in the data. The ARMA model addresses the de-correlation of residuals in the time series data. De Livera et al. prove that BATS model can improve the prediction performance compared to simple state space models. A key feature of both frameworks is that they rely on an optimized method that greatly reduces the computational complexity of the maximum likelihood estimation.

The BATS model is rooted in Exponential Smoothing. It reformulates equation (3) as $$y_{t+1}^{\omega} = l_t + \phi \cdot b_t + \sum_{i=1}^{T} s_{t-m_i+1}^{i} + d_t \quad (7)$$

and the hidden state variables from (2) as $$l_t = l_{t-1} + \phi \cdot b_{t-1} + \alpha \cdot d_t, \quad (8)$$

$$b_t = (1-\phi) \cdot b + \phi \cdot b_{t-1} + \beta \cdot d_t,$$

$$s_t^i = s_{t-m_i}^i + \gamma_i \cdot d_t,$$

with $$d_t = \sum_{i=1}^{p} \varphi_i \cdot d_{t-1} + \sum_{i=1}^{q} \theta_i \epsilon_{t-1} + \epsilon_t.$$

Here, $y_t^{\omega}$ is the observation at time step t Box-Cox transformed with the parameter co. Similar to above, $s_t^i$ denotes the i-th seasonal component, $l_t$ the local level and $b_t$ the dampened trend. The notation $d_t$ stands for the ARMA (p,q) process for residuals. As we cannot compute the prediction error $e_t$ directly, it is modeled as a Gaussian white noise process. $e_{t-1}$ stands for the i-th Box-Cox transformed prediction error. The Box-Cox transformation parameter ω, the smoothing parameters a and the trend damping factor (p, the ARMA coefficients $\phi_i$ and $\theta_i$, as well as the seasonal smoothing factor $\gamma_i$ can all be estimated by the means of a Gaussian likelihood process.

TBATS extends the BATS model by including a trigonometric formulation for decomposing complex seasonal time series and identifying latent seasonal components. The seasonal component is modeled based on a Fourier series as follows:

$$s_t^{(i)} = \sum_{j=1}^{k_i} s_{j,t}^{(i)}, \quad (10)$$

$$s_{j,t}^{(i)} = s_{j,t-1}^{(i)} \cdot \cos \lambda_j^{(i)} + s_{j,t-1}^{*(i)} \cdot \sin \lambda_j^{(i)} + \gamma_1^{(i)} \cdot d_t,$$

$$s_{j,t}^{*(i)} = -s_{j,t-1} \cdot \sin \lambda_j^{(i)} + s_{j,t-1}^{*(i)} \cdot \cos \lambda_j^{(i)} + \gamma_2^{(i)} \cdot d_t,$$

where $\gamma_1^{(i)}$ and $\gamma_2^{(i)}$ are the smoothing parameters. $\gamma_1^{(i)}$ is retrieved by $$\lambda_j^{(i)} = \frac{2\pi j}{m_i}, \quad (11)$$

whereby $m_i$ describes the length of the i-th seasonal period. $s_{j,t}^{(i)}$ denotes the stochastic level of the i-th seasonal component. $s_{j,t}^{*(i)}$ reflects the change in the seasonal component over time. The number of harmonics required for the i-th seasonal component is denoted by $k_i$. The trigonometric expression of seasonality terms helps to reduce the number of model parameters when the frequencies of seasonality are high. It also adds to the flexibility of the model in dealing with complex seasonality. The measurement equation for $y_{t+1}^{(\omega)}$ discussed in equation (7) is replaced by $$y_{t+1}^{(\omega)} = l_{t-1} + \phi \cdot b_{t-1} \sum_{k=1}^{T} s_{t-1}^{(i)} + d_t. \tag{12}$$

Point forecasts and forecast intervals for both the TBATS and the BATS models can be obtained using the inverse BoxCox transformation of appropriate quantiles of the distribution of $y_{n+h|h}^{(\omega)}$. h is hereby the forecasting horizon and n the number of points in the observed data $y=(y_1, \ldots, y_n)$.

A fourth group of algorithms are in the following denoted as "Naive Methods". To benchmark the advanced prediction algorithms presented above and to show their effectiveness, two naive methods are introduced. The naive methods predict the next values of time series without further computational intelligence. The lack of computations or advanced models makes them very fast and demonstrates, whether the predictions of the advanced methods are really accurate, or if the same results can be achieved with less effort. The first naive method simply predicts the last measurement as future value $$\hat{y}_{t+1} = y_t. \tag{13}$$

The second naive method is a driftless Naive Random Walk. A time series is said to follow a Random Walk if the differences from one observation to the next one are random. In other words, the series itself is not necessarily random but its first differences are. A Random Walk for a time series is written as $$\hat{y}_{t+1} = y_t + \varepsilon_{t+1}, \tag{14}$$

where $\hat{y}_{t+1}$ is the predicted value at time step t+1, $y_t$ its current value at time step t and $\varepsilon_{t+1}$ is the unsystematic component and can be modeled as a white noise process (O. Gjølberg and B.-A. Bengtsson (1997): "Forecasting quarterly hog prices: Simple autoregressive models vs. naive predictions,".

In the following, the concept of Bootstrap Aggregation is introduced. Bootstrap Aggregation, commonly known as Bagging, is a method for reducing variance without increasing the bias of predictions. It enables to achieve more accurate predictions by combining forecasts of different predictors. Combining predictions is especially useful when the uncertainty about the environment and the prediction method is relatively high, and when errors need to be moderated. In Bagging, predictors are trained on bootstrapped versions of the original data. The predictors form an ensemble. Predictions are generated by applying all predictors on the data set at hand and then combining the results. This can be achieved by averaging the obtained results, for example. Bagging tackles the three sources of uncertainties. It helps to moderate data uncertainty and the variation of the inherent random component that exist in time series. It also helps to temper the uncertainty linked with the selection of the optimal model form. Parameter uncertainty can furthermore be softened especially in terms of selecting the best set of parameters for de-scribing the data. Bergmeir et al. show an example of successfully applying bagging for time series prediction (C. Bergmeir, R. J. Hyndman, and J. M. Benitez (2016): "Bagging exponential smoothing methods using STL decomposition and Box-Cox transformation,").

In the following, the experimental setup and the means for evaluating the results are introduced. The reference data consists of an extensive set of recordings of current measurements in power trains of EVs. The measurement data are recorded on public roads and reflect the behavior of power trains of EVs under common driving conditions. The data set covers in total 4 h of driving data measured at a frequency of 100 Hz. For the experiments, the focus was on the 5 HV currents of the HV battery, the electric machine, the electric heating, the air-conditioning compressor and the DC/DC converter. The data set at hand was divided into training and test segments to apply nested cross-validation. To this end, the data was split into chunks of constant size. Each chunk consists of 20 data points. In total, 10,480 chunks are taken into consideration.

To better estimate the prediction error of each algorithm, a common approach is to average the errors over all the train/test splits. The technique that was used is based on a method called forward-chaining. It is referred to in the literature as rolling-origin evaluation (L. J. Tashman (2000): "Out-of-sample tests of forecasting accuracy: an analysis and review") or rolling-origin-recalibration evaluation (C. Bergmeir and J. Bentez (2012): "On the use of cross-validation for time series predictor evaluation,"). Based on this method, each data chunk was considered as the test set (see FIG. 3). The previous data was assigned to the training set.

Figure 3:
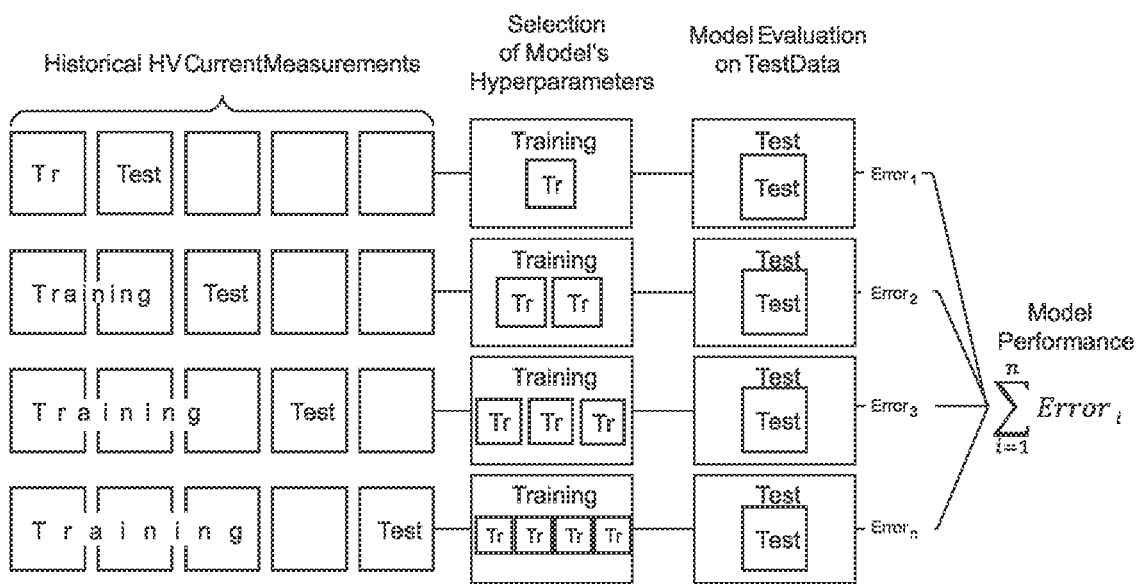
FIG. 3 shows a chronological representation of a nested cross-validation pipeline.

Assuming that the data set can be divided in 5 chunks as shown in FIG. 3, four different training and test splits were determined. The pipeline is used to split the data set into, in this exemplary case, five training and test chunks.

FIG. 3 shows a chronological representation of the nested cross-validation pipeline. The historical HV current measurements, which are split into five chunks are shown on the left. In a first run, one chunk was used as training data and one chunk was used as test data. In a second run, two chunks were used as training data and one chunk as test data, in a third run, three chunks were used as training data and one chunk as test data, and in a fourth run, four chunks were used as training data and one chunk as test data. Training was used to select the model's hyperparameters (with one chunk of data in the first run, two chunks in the second run etc.), and the test data was used to evaluate the model. Each run yields an error $Error_1$ to $Error_4$, and the model performance was determined by summing $Error_1$ to $Error_4$.

By producing multiple different train/test splits, a better assessment of the prediction accuracy of each algorithm was achieved. The error on each split is again averaged in order to compute a robust estimate of each algorithm's error. The overall prediction error $\varepsilon$ is modeled according to $$\varepsilon = \sum_{i=1}^{n} \sum_{j=1}^{m} \epsilon_j^{(i)}, \tag{15}$$

where n stands for the number of splits, m for the number of data points per split and $\epsilon_j^{(i)}$ for the error performance metric at hand.

To measure the performance of each algorithm in respect of its accuracy and computational efficiency, the following metrics are introduced: Root Mean Square Error (RMSE) and Mean Absolute Percentage Error (MAPE).

The Root Mean Square Error (RMSE) is a quadratic scoring rule that measures the average magnitude of the error. It is the square root of the average of squared differences between prediction $\hat{y}_t$ and actual observation $y_t$. It is given by $$RMSE(y_t, \hat{y}_t) = \sqrt{\sum_{k=1}^{h} \frac{(y_t - \hat{y}_t)^2}{h}} \tag{16}$$

where h is the prediction horizon.

The Mean Absolute Percentage Error (MAPE) is a statistical measure of the accuracy of a prediction model. In a set of predictions divided by the actual values, the MAPE is the average error magnitude. The average error magnitude reflects the average over the test sample of the absolute differences between prediction and actual observation where all individual differences have equal weight. It is given by $$MAPE(y_t, \hat{y}_t) = \frac{100}{h} \sum_{t=1}^{h} \frac{|y_t - \hat{y}_t|}{|y_t|} \quad (17)$$

Analyzing the run-time performance of each prediction algorithm is important for investigating its suitability for real-time systems. If the prediction takes too much time, it may become obsolete. Therefore, all algorithms were executed several times on the same execution platform under the same circumstances and measure their run-time. In the subsequent measurement, a computer with a 2.4 GHz CPU and 8 GB of RAM was used.

The test setup was used on identify, among a pool of 7 candidate algorithms, or their best combination. Its essence was to link the knowledge on prediction errors of different algorithms to historical data. Therefore, in the following, the focus is on the experiments applied for mapping historical current measurements to prediction method performances. In a first step, the focus is on retrieving the optimal hyper parameters of each algorithm and assessing the individual performances. In the second step, the added value of combining forecasts from different methods in reducing uncertainty and increasing forecasting accuracy is assessed.

In the following, the individual performance of the algorithms in predicting future HV current is assessed. The analysis is performed under specific constraints. The main constraint is that the inference and prediction of future current values are based only on historical measurements. The performance of each algorithm is assessed using the nested cross-validation procedure described before. In a first stage, an exhaustive grid search through a manually specified subset of the hyper parameter space on the training splits was performed. This helps to identify the best combination of hyper parameters for each algorithm. As a selection metric, the Akaike Information Criterion (AIC) was employed. The AIC rewards the goodness of fit as assessed by the likelihood function given the number of estimated parameters k per algorithm. Simultaneously, k and the algorithm's complexity are penalized by the AIC to prevent over-fitting. Let L be the maximum value of the likelihood function for the prediction algorithm. The AIC value of the algorithm is then $$AIC = 2k - 2 \ln(\hat{L}) \quad (18)$$

where the log-likelihood is a representative measure of the model fit. Statistically, the higher the number, the better the fit. The preferred model, respectively the best combination of hyper parameters, is hence the one with the minimum AIC value. In a second stage, the prediction performance of each algorithm on the test data splits is evaluated. In total, the three metrics discussed above are used as comparative values. Thereby an investigation can be performed on how well each individual algorithm performs both in terms of prediction accuracy and run-time efficiency. In the given context of HV current measurements, attaining a trade-off between run-time and accuracy is most critical. The focus of this stage of the analysis is thereby on identifying the algorithm that ensures the best trade-off. To this purpose, the optimal number of historical data points necessary per algorithm is also taken into consideration. The results of each algorithm relative to a prediction horizon of 20 time-steps are provided below.

Another aspect in an analysis of the potential added value of Bootstrap Aggregation. It was assumed that combining predictions derived from substantially different methods helps to increase the overall accuracy. Bootstrap Aggregation may be relevant in the present case given that the uncertainty about which method is most accurate and under which conditions the power train is operating are high. Formal procedures were adopted in combining predictions of the algorithms. In the ideal case, prediction errors are negatively related so that they might cancel each other. Thereby, we follow an equal-weights approach as described in the following equation $$\hat{y}_{t+1} = \frac{1}{M} \sum_{i=1}^{M} \hat{y}_{t+1}^{(i)} \quad (19)$$

where $\hat{y}_{t+1}^{(i)}$ is the predicted value of algorithm $i \in [1 \ldots M]$ at time step t+1 and M=7 is the number of algorithms in the pool.

In the following, the results are presented. Each experiment is discussed separately. First, the individual performance assessment is assessed. In this subsection, the aim is to assess the isolated performance of each prediction algorithm. To this end, the performance metrics discussed above are used. The values obtained for the RMSE and MAPE metrics are summarized in FIG. 4a. For the comparison of the retrieved prediction performances, the naive method was used as benchmark. It is only outperformed by the ARIMA algorithm in matters of the MAPE. The MAPE improvement achieved by ARIMA is 8%. These superior results are achieved due to the integration part of ARIMA. Thus, the algorithm can better adjust itself to the nonstationary data. It is also relevant to mention that all considered algorithms except for BATS and TBATS achieved an average prediction error rate of less than 5%. However, the comparison with regard to the RMSE retrieves better results. ARIMA, BATS and TBATS outperform the benchmark. Especially BATS and TBATS achieve much better results. Their good RMSE results are interesting, because they both obtained relatively high MAPE values with respectively 7.47% and 7.48%. The other naive method, Random Walk, and the Exponential Smoothing Algorithms achieve comparable results like the benchmark. The discrepancies obtained both in terms of RMSE and MAPE hint that combining the forecasts of several algorithms might result in an improvement of the overall performance. FIG. 4a shows an overview of the prediction performance scores obtained by the algorithms on the test set.

The table shown in FIG. 4b extends the results described in FIG. 4a to cover computational aspects. As discussed above, computational complexity and run-time requirements may be deemed critical to the objective of predicting HV current measurements. Considering the prediction horizon of below 20 time-steps, the methods of seasonal ARIMA, BATS and TBATS may be deemed obsolete. Their respective run-time may exceed our limit of at maximum 200 ms. Under real usage conditions, the obtained forecasts may be irrelevant by the time they are computed. ARIMA misses the run-time limit only shortly. Further optimizations may make this algorithm feasible for the purposes. Without further optimizations, the focus may be set on the remaining simplest methods for deployment. FIG. 4b shows a comparison per algorithm with regard to accuracy and efficiency.

In this section, the results obtained during bootstrap aggregation. For this experiment, the five algorithms with the lowest MAPE were combined. Thus, the algorithms considered for the combination are ARIMA, the simple and Holt-Winters Exponential Smoothing, as well as the Random Walk and the naive method, as can be seen from FIG. 4a. As mentioned above, an equal weights approach was followed. The prediction values of each algorithm are therefore averaged at each prediction run-through. The hereby discussed results are obtained for the same data sets used above. This enables an objective comparison of the individual and combined performances on the same data. For the same test set, the bootstrap aggregation resulted in an RMSE value of 1.74 and a MAPE value of 4.19%. This means again a prediction error rate of below 5%. Compared to the individual performances, the bootstrap aggregation outperformed all individual methods in terms of the MAPE except for ARIMA. Accordingly, bootstrap aggregation fails to improve the overall prediction. Nevertheless, the results may be improved with an adaptive weights approach. Instead of the equal weights approach used in the context of the present disclosure, the adaptive weights approach might be able to benefit from the high accuracy of ARIMA.

As expected, Bootstrap Aggregation has the worst runtime of all considered approaches. As the concept combines the predictions of several algorithms, it also sums up the required run-time of all these algorithms. Especially in the application field outlined above, the execution on ECUs, the long runtime may be considered a disadvantage. Regrettably, this disadvantage might not be equalized by the achieved results.

Time delays between distributed systems lead to outdated measurement signals. But up-to-date input data is required for control functions, especially in real-time systems like power trains of EVs. A solution to this problem is to predict delayed signals until the present. The goal of this paper is to evaluate which algorithms are suited for time series prediction of delayed measurement signals of power trains of EVs. For this purpose, we evaluate 5 state-of-the-art time series prediction algorithms and 2 naive methods. As it is important for real-time systems to retrieve information in the required time frame, we focus our evaluation not only on accuracy which we measure with the RMSE and the MAPE, but also on the required run-time to execute the prediction. BATS and TBATS are the most accurate algorithms. However, due to their high outliers, they are unsuited for our purposes. ARIMA offers the best compromise between high accuracy and small outliers. As expected, the naive method is the fastest method. Surprisingly, although it is the simplest of all methods, its accuracy is not far below the other methods. Its relatively good results show the difficulty of predicting HV measurements of electric power trains accurately. Thus, further work needs to be done to enable fast and accurate predictions. A possibility for future work is to optimize ARIMA and try to make it faster. Another possibility is to combine the predictions of several algorithms with Bootstrap Aggregation. Although the here implemented equal weights approach outperforms almost all algorithms, it is not able to achieve the low MAPE value of ARIMA. Further work is necessary to investigate, if an adaptive weights approach is able to outperform ARIMA. Until now, Bootstrap Aggregation requires by far the most run-time.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A system for determining estimated sensor data of a sensor, the system comprising processing circuitry configured to:
   obtain a plurality of samples of sensor data of the sensor;
   obtain information on a time offset between the sensor data of the sensor and a reference time;
   perform a time-series projection based on the plurality of samples of the sensor data, the time-series projection being performed using an auto-regressive statistical model;
   determine an estimate of the sensor data for the reference time based on the time-series projection and based on the time offset between the sensor data and the reference time; and
   use the estimate to perform a real-time control operation in a distributed system having at least one controller and the sensor.

2. The system according to claim 1, wherein the auto-regressive statistical model is an auto-regressive moving average-model.

3. The system according to claim 2, wherein the auto-regressive statistical model is applied on a differentiation of the plurality of samples of the sensor data.

4. The system according to claim 3, wherein the auto-regressive statistical model is applied on a once-derived version of the plurality of samples of the sensor data.

5. The system according to claim 4, wherein the auto-regressive statistical model is one of an Autoregressive Integrated Moving Average, ARIMA, or an Autoregressive Moving Average, ARMA, model.

6. The system according to claim 1, wherein the auto-regressive statistical model is one of an Autoregressive Integrated Moving Average, ARIMA, or an Autoregressive Moving Average, ARMA, model.

7. The system according to claim 1, wherein the auto-regressive statistical model is applied on a differentiation of the plurality of samples of the sensor data.

8. The system according to claim 1, wherein the time-series projection is performed using at least 20 samples and/or at most 60 samples of the plurality of samples of the sensor data of the sensor.

9. The system according to claim 1, wherein the sensor data of the sensor relates to a current of a power train of an electric vehicle.

10. A system for determining estimated sensor data of a sensor, the system comprising processing circuitry configured to:
    obtain a plurality of samples of sensor data of the sensor;
    obtain information on a time offset between the sensor data of the sensor and a reference time;
    perform a time-series projection based on the plurality of samples of the sensor data, the time-series projection being performed using an auto-regressive statistical model;
    determine an estimate of the sensor data for the reference time based on the time-series projection and based on the time offset between the sensor data and the reference time; and
    use the estimate to perform a real-time control operation in a distributed system having at least one controller and at least one sensor; and
    wherein the processing circuitry is configured to perform the time-series projection such that the time offset between the sensor data and the reference time is bridged by the time-series projection.

11. The system according to claim 10, wherein the processing circuitry is configured to output the estimate of the sensor data.

12. The system according to claim 1, wherein the processing circuitry is configured to perform the time-series projection with a projection horizon that matches the time offset between the sensor data and the reference time.

13. The system according to claim 1, wherein the reference time is based on sensor data of a second sensor, the sensor data of the second sensor comprising a second plurality of samples, wherein the processing circuitry is configured to determine the estimate of the sensor data such that the estimate of the sensor data is time-synchronized to a latest sample of the sensor data of the second sensor.

14. The system according to claim 13, wherein the processing circuitry is configured to obtain the sensor data of the second sensor, and to derive the time offset between the sensor data of the sensor and the reference time based on the sensor data of the second sensor and based on the sensor data of the sensor.

15. The system according to claim 14, wherein the processing circuitry is configured to obtain the sensor data of the second sensor, wherein the processing circuitry is configured to output time-synchronized versions of the estimated sensor data of the sensor and of the sensor data of the second sensor.

16. The system according to claim 13, wherein the processing circuitry is configured to obtain the sensor data of the second sensor, wherein the processing circuitry is configured to output time-synchronized versions of the estimated sensor data of the sensor and of the sensor data of the second sensor.

17. The system according to claim 13, wherein the auto-regressive statistical model is an auto-regressive moving average-model.

18. The system according to claim 17, wherein the auto-regressive statistical model is applied on a differentiation of the plurality of samples of the sensor data.

19. A method for determining estimated sensor data, the method comprising:
- obtaining a plurality of samples of sensor data of a sensor;
- obtaining information on a time offset between the sensor data of the sensor and a reference time;
- performing a time-series projection based on the plurality of samples of the sensor data, the time-series projection being performed using an auto-regressive statistical model;
- determining an estimate of the sensor data for the reference time based on the time-series projection and based on the time offset between the sensor data and the reference time; and
- using the estimate to perform a real-time control operation in a distributed system having at least one controller and at least one sensor.

20. The system of claim 1, further comprising:
- the sensor; and
- at least one vehicle communication bus operably connecting the sensor to the processing circuitry, and wherein the sensor provides the plurality of samples of the sensor data to the processing circuitry at least in part via the vehicle communication bus.

* * * * *